United States Patent [19]
Lark et al.

[11] Patent Number: 5,617,034
[45] Date of Patent: Apr. 1, 1997

[54] SIGNAL IMPROVEMENT IN THE SENSING OF HYDRAULIC CYLINDER PISTON POSITION USING ELECTROMAGNETIC WAVES

[75] Inventors: Wayne W. Lark, Joliet, Ill.; Denny Morgan, San Diego, Calif.; James R. Turba, Joliet, Ill.

[73] Assignee: Caterpillar Inc., Peoria, Ill.

[21] Appl. No.: 437,735

[22] Filed: May 9, 1995

[51] Int. Cl.$^6$ ............................ G01R 33/32; G01R 27/04
[52] U.S. Cl. .............................. 324/635; 324/633; 92/5 R; 91/361
[58] Field of Search ..................... 324/635, 644, 324/629, 633, 636, 637; 92/5 R; 91/189 R, 1, 361, 275, 459

[56] References Cited

U.S. PATENT DOCUMENTS

| | | | |
|---|---|---|---|
| 3,589,177 | 6/1971 | Merlo | 73/116 |
| 3,726,191 | 4/1973 | Johnston et al. | 92/5 R |
| 4,060,762 | 11/1977 | McKeown | 324/635 |
| 4,321,946 | 3/1982 | Paulos et al. | 137/554 |
| 4,365,503 | 12/1982 | Ho et al. | 73/3 |
| 4,588,953 | 5/1986 | Krage | 324/58.5 C |
| 4,689,533 | 8/1987 | Yang | 318/281 |
| 4,689,553 | 8/1987 | Hiddox | 324/636 |
| 4,737,705 | 4/1988 | Bitar et al. | 324/58.5 C |
| 4,749,936 | 6/1988 | Taplin | 324/58.5 B |
| 4,757,745 | 7/1988 | Taplin | 91/361 |
| 4,819,546 | 4/1989 | Ernst et al. | 92/5 R |
| 4,881,071 | 11/1989 | Monterosso et al. | 340/870 |
| 4,901,628 | 2/1990 | Krage | 92/5 R |
| 4,952,916 | 9/1990 | Taplin | 340/686 |
| 4,987,823 | 1/1991 | Taplin et al. | 91/361 |
| 4,995,303 | 2/1991 | Rohm | 92/5 R |
| 5,150,060 | 9/1992 | Bitar | 324/635 |
| 5,182,979 | 2/1993 | Morgan | 92/5 R |
| 5,241,278 | 8/1993 | Bitar | 324/635 |
| 5,320,325 | 6/1994 | Young et al. | 92/5 R |
| 5,325,063 | 6/1994 | Morgan | 324/636 |
| 5,438,274 | 8/1995 | Bitar et al. | 324/636 |
| 5,455,309 | 10/1995 | Semura | 324/207.24 |

FOREIGN PATENT DOCUMENTS

| | | | |
|---|---|---|---|
| 0199224 | 4/1985 | European Pat. Off. | |
| 610215 | 1/1986 | Japan | |
| 1688157 | 10/1991 | U.S.S.R. | 324/633 |

Primary Examiner—Sandra L. O'Shea
Assistant Examiner—Raymond Y. Mah
Attorney, Agent, or Firm—Alvin J. Riddles; Steven G. Kibby

[57] ABSTRACT

Improvement of the ability to detect selected resonant frequencies associated with the position of the piston in a piston position sensing system using electromagnetic waves in the fluid in a hydraulic cylinder is achieved by positioning the electric signal input and output probes with 90 degree separation around the circumferential periphery of the cylinder to suppress coupling into unwanted modes that diminish detectability of particular resonant frequency signals, In a coaxial sensing system "dummy" probes at 90 degree separation to each other and 90 degree separation to the input and output probes operate to improve symmetry and resonance shape and to suppress unwanted modes.

20 Claims, 6 Drawing Sheets

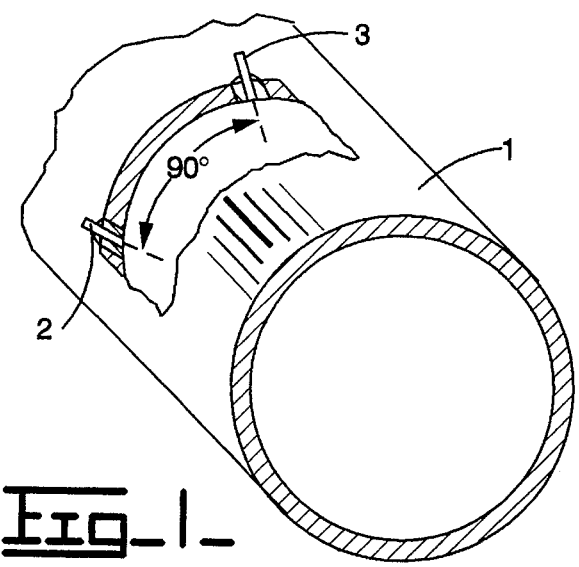
Fig_1_
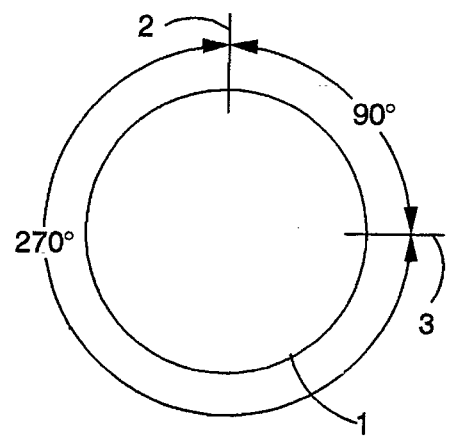
Fig_2_
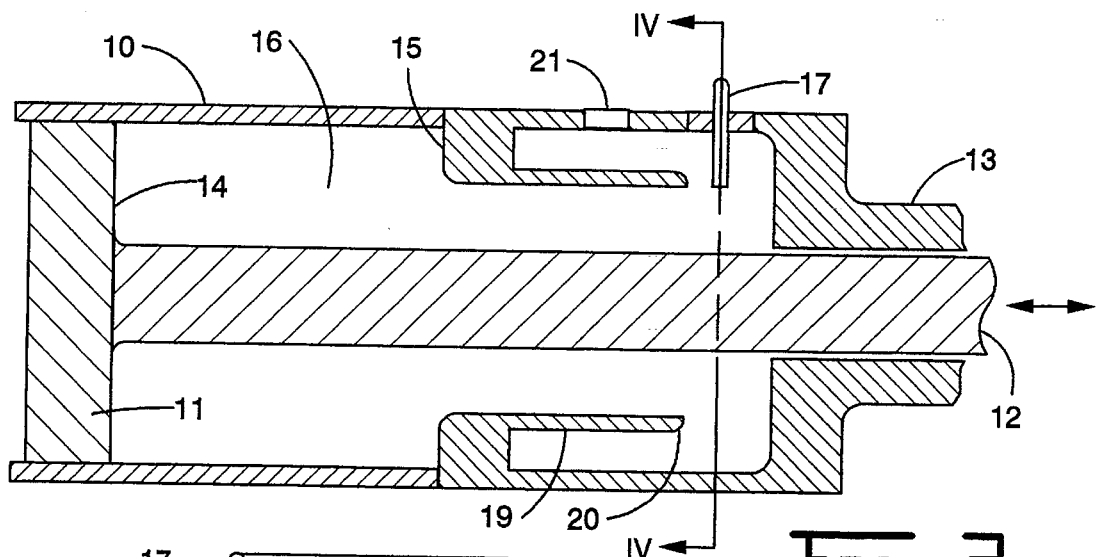
Fig_3_
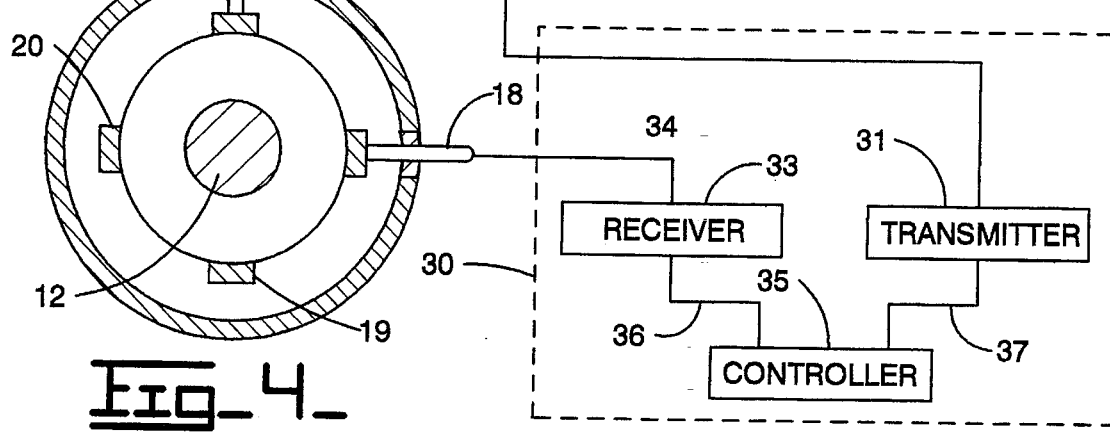
Fig_4_

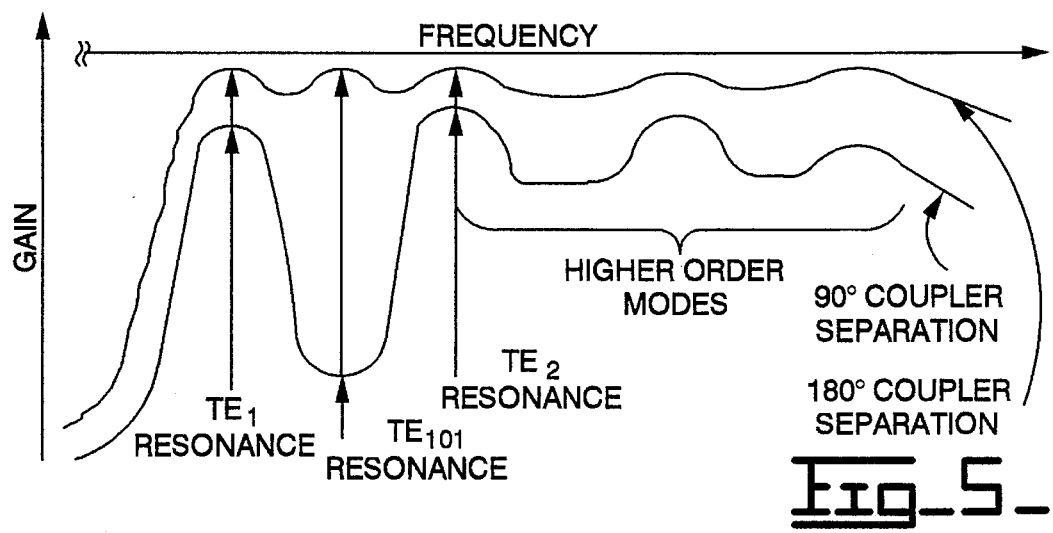
Fig_5_
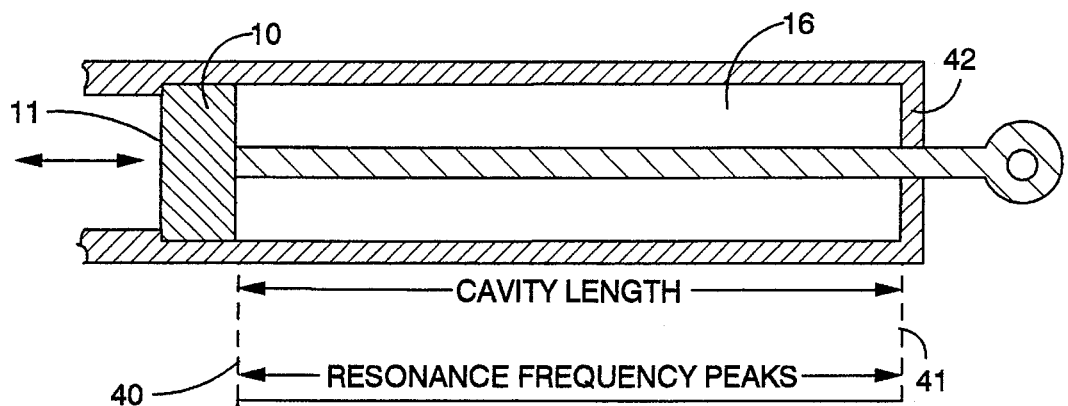
Fig_6_
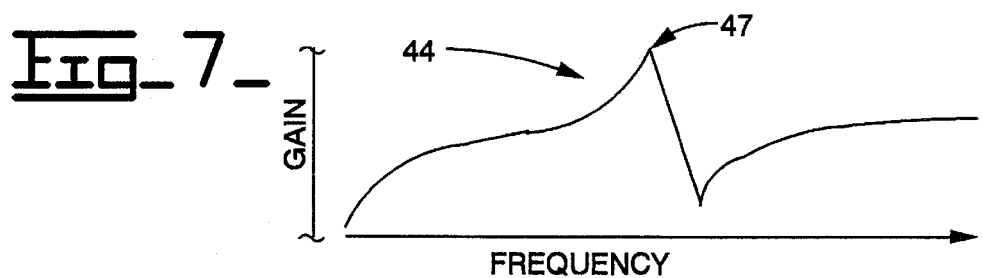
Fig_7_

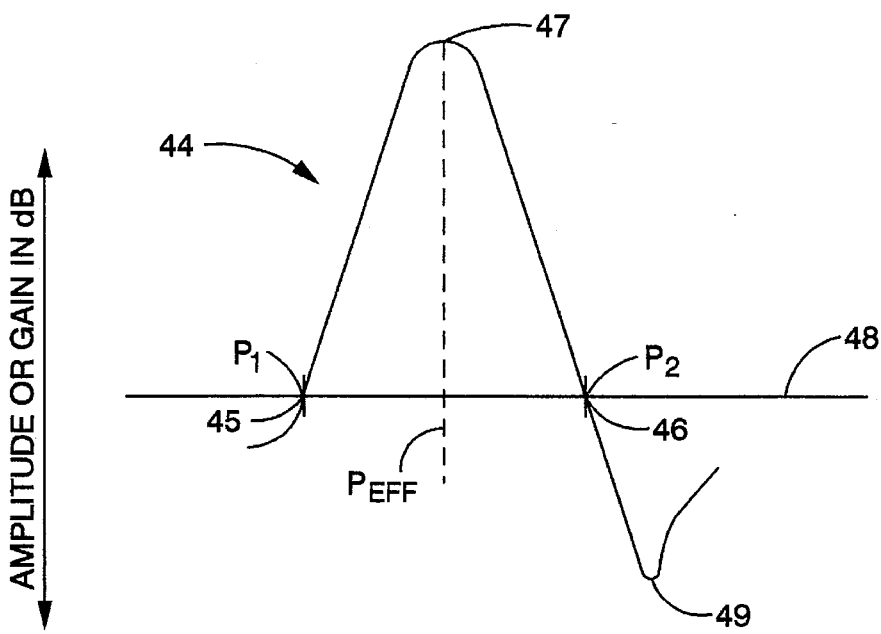
Fig_8_
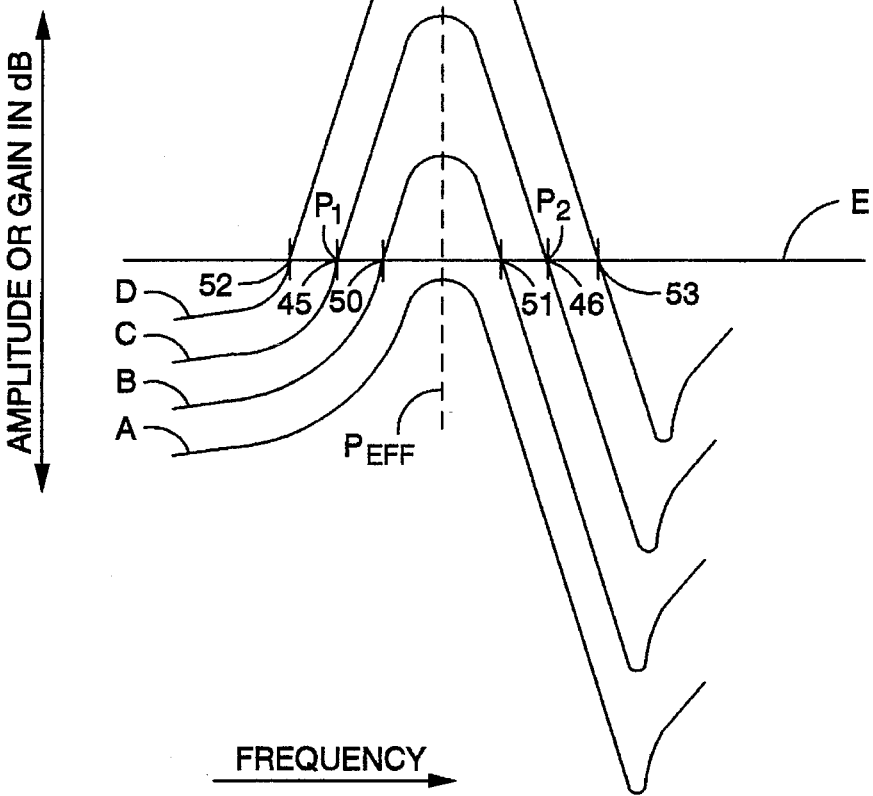
Fig_9_

| A | B | C | D | E |
|---|---|---|---|---|
| FREQUENCY | PERIOD | DISTANCE | PERIOD * 130944 | COUNTS |
| 100000000/C* | 1/A* | meters | (1/A) * 130944 | (D*) * 16MHz |
| 50000000 | 0.000000020000 | 2.00 | 0.002618880 | 41902.080 |
| 52631579 | 0.000000019000 | 1.90 | 0.002487936 | 39806.976 |
| 55555556 | 0.000000018000 | 1.80 | 0.002356992 | 37711.872 |
| 58823529 | 0.000000017000 | 1.70 | 0.002226048 | 35616.768 |
| 62500000 | 0.000000016000 | 1.60 | 0.002095104 | 33521.664 |
| 66666667 | 0.000000015000 | 1.50 | 0.001964160 | 31426.560 |
| 71428571 | 0.000000014000 | 1.40 | 0.001833216 | 29331.456 |
| 76923077 | 0.000000013000 | 1.30 | 0.001702272 | 27236.352 |
| 33333333 | 0.000000012000 | 1.20 | 0.001571328 | 25141.248 |
| 90909091 | 0.000000011000 | 1.10 | 0.001440384 | 23046.144 |
| 100000000 | 0.000000010000 | 1.00 | 0.001309440 | 20951.040 |
| 111111111 | 0.000000009000 | 0.90 | 0.001178496 | 18855.936 |
| 125000000 | 0.000000008000 | 0.80 | 0.001047552 | 16760.832 |
| 142857143 | 0.000000007000 | 0.70 | 0.000916608 | 14665.728 |
| 166666667 | 0.000000006000 | 0.60 | 0.000785664 | 12570.624 |
| 200000000 | 0.000000005000 | 0.50 | 0.000654720 | 10475.520 |
| 250000000 | 0.000000004000 | 0.40 | 0.000523776 | 8380.416 |
| 333333333 | 0.000000003000 | 0.30 | 0.000392832 | 6285.312 |
| 500000000 | 0.000000002000 | 0.20 | 0.000261888 | 4190.208 |
| 1000000000 | 0.000000001000 | 0.10 | 0.000130944 | 2095.104 |
| 2000000000 | 0.000000000500 | 0.05 | 0.000065472 | 1047.552 |
Fig_11_
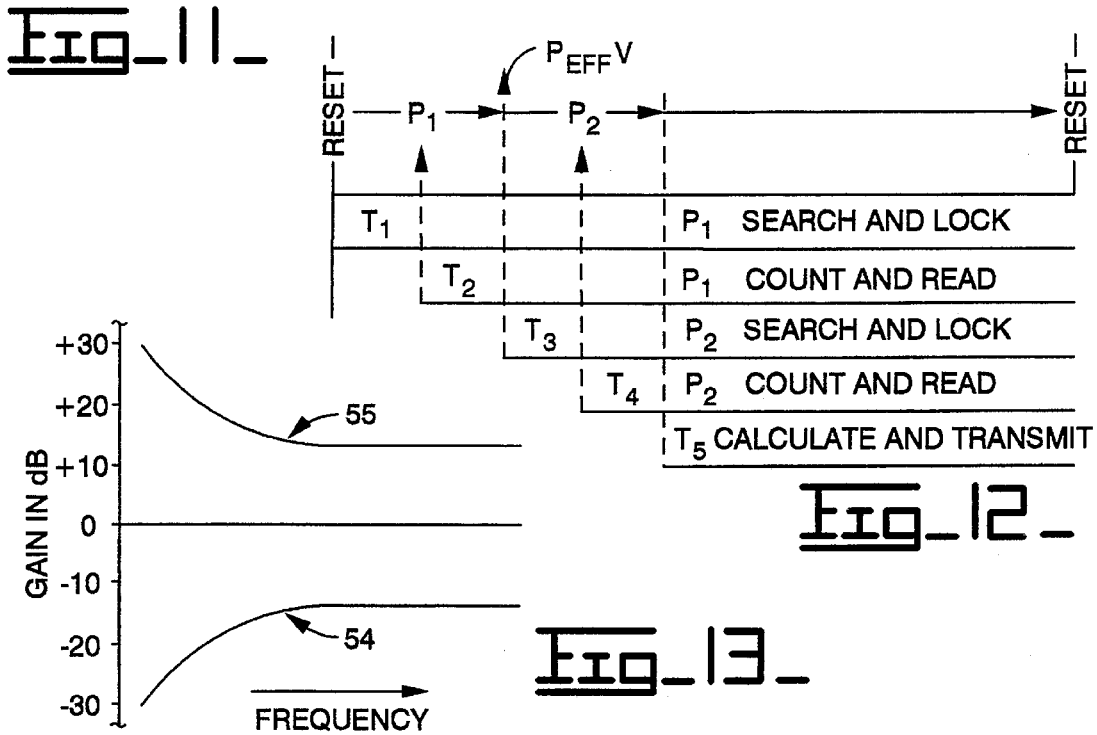
Fig_12_
Fig_13_

SIGNAL IMPROVEMENT IN THE SENSING OF HYDRAULIC CYLINDER PISTON POSITION USING ELECTROMAGNETIC WAVES

TECHNICAL FIELD

The invention relates to the sensing of the position of a piston in a hydraulic cylinder through the use of electromagnetic waves in the cylinder and in particular to making more detectable specific electromagnetic waves, from the characteristics of which, the piston position is to be determined.

This invention arose during development efforts related to the subject matter of U.S. patent application Ser. Nos. 08/437,594 and 08/437,611 now U.S. Pat. No. 5,608,332.

BACKGROUND AND RELATION TO THE PRIOR ART

Hydraulic cylinder, piston and rod combinations are being increasingly used in fields that involve the moving and positioning of material and objects. As the various applications of hydraulic cylinder, piston and rod combinations have progressed, more stringent operational criteria are being encountered, and a need has developed to precisely, reliably and continuously sense the position of the piston and it's related displacement parameters, velocity and acceleration.

A promising approach developing in the art employs the correlation of resonant frequencies of electromagnetic waves in the cavity that is made up of the cylinder and the piston, with the dimensions of the cavity. In one aspect of this approach the wave performance is as it is in a transmission line with shorted ends in that the resonance frequency of an electromagnetic standing wave correlates inversely with the cavity length.

One application of the use of electromagnetic waves for piston position sensing is shown in U.S. Pat. No. 4,588,953 wherein the frequency, of electromagnetic waves introduced into the cylinder between the closed end of the cylinder and the piston, is swept between two limits with the frequency of the detected resonant peak being indicative of the piston position.

In U.S. Pat. No. 4,737,705, improvement is achieved with a coaxial resonant cavity with a central core within which the electromagnetic waves are launched and propagated in the mode referred to as the transverse electromagnetic wave (TEM) mode. The cylinder on the rod side of the piston is one type of coaxial cavity.

In European Patent Office (EPO) published application number 0 199 224 published Oct. 29, 1986 the detection of resonance of electromagnetic waves in a hydraulic cylinder cavity between the closed end and the piston is improved by introducing the waves in the center of the closed end of the cylinder and employing an antenna with a right angle bend extending axially from the periphery of the cylinder as the receiver in order to confine the electromagnetic wave energy launched and propagated to a mode referred to as the TM cylindrical mode.

In U.S. Pat. No. 5,182,979, compensation is provided for differences in insertion losses as the linear extension of the piston and rod in the cylinder takes place.

In U.S. Pat. No. 5,325,063 identification of a fundamental resonance frequency is enhanced by the use of positive and negative slope intercepts of a resonance signal with respect to a reference level, where the positive slope is at the lower frequency and the negative slope is at the higher frequency.

As progress in the art continues, greater precision is being sought in resonant frequency detection, and a need is developing to be able to more precisely identify a specific resonant frequency signal.

SUMMARY OF THE INVENTION

The signals indicative of resonant frequencies of standing electromagnetic waves in the fluid of a hydraulic cylinder are improved where the input and output couplers for the electromagnetic waves are separated by 90 degrees on the periphery of the hydraulic cylinder. The 90 degree separation operates to suppress coupling of the electromagnetic wave energy into interfering modes which operate to make the signals in the desired mode more difficult to detect and may reduce the range of piston travel that is detectable.

BRIEF DESCRIPTION OF THE DRAWINGS

FIG. 1 is a perspective illustration of the relative positioning of the transmitting and receiving couplers on a hydraulic cylinder. FIG. 2 is a schematic angular illustration of the relative positioning of transmitting and receiving couplers.

FIG. 3 is a schematic cross sectional illustration of the coupler positioning in the preferred coaxial embodiment of the invention.

FIG. 4 is a schematic cross sectional view along the line 4—4 of FIG. 3 showing the input, output and dummy coupler positioning and connections in the preferred embodiment of the invention.

FIG. 5 is a graphic depiction comparing resonance signal characteristics with relation to coupler positioning.

FIG. 6 is an illustration of the dimensional correlation of the hydraulic cylinder resonance frequency peaks with piston position between the extended and collapsed limits of piston travel.

FIG. 7 is an illustration of a portion of a hydraulic cylinder transfer characteristic curve at a resonance frequency peak.

FIG. 8 is a graphical illustration of Gain vs Time and Frequency of an electromagnetic wave resonance with positive and negative slope intercepts with a reference level, and showing the effective resonance position.

FIG. 9 is an illustration of the considerations involved in the selection and use of lock on points on the positive and negative slopes of a resonance at specific gain levels.

FIG. 11 is an example tabulation of the type of resonance information correlated with piston position that is assembled during static characterization of the cylinder.

FIG. 12 is a cycle event time chart indicating the type of computations performed. FIG. 13 is a graphical illustration of the range of the effect of equalization in the processing.

DESCRIPTION OF THE INVENTION

Figure 10:
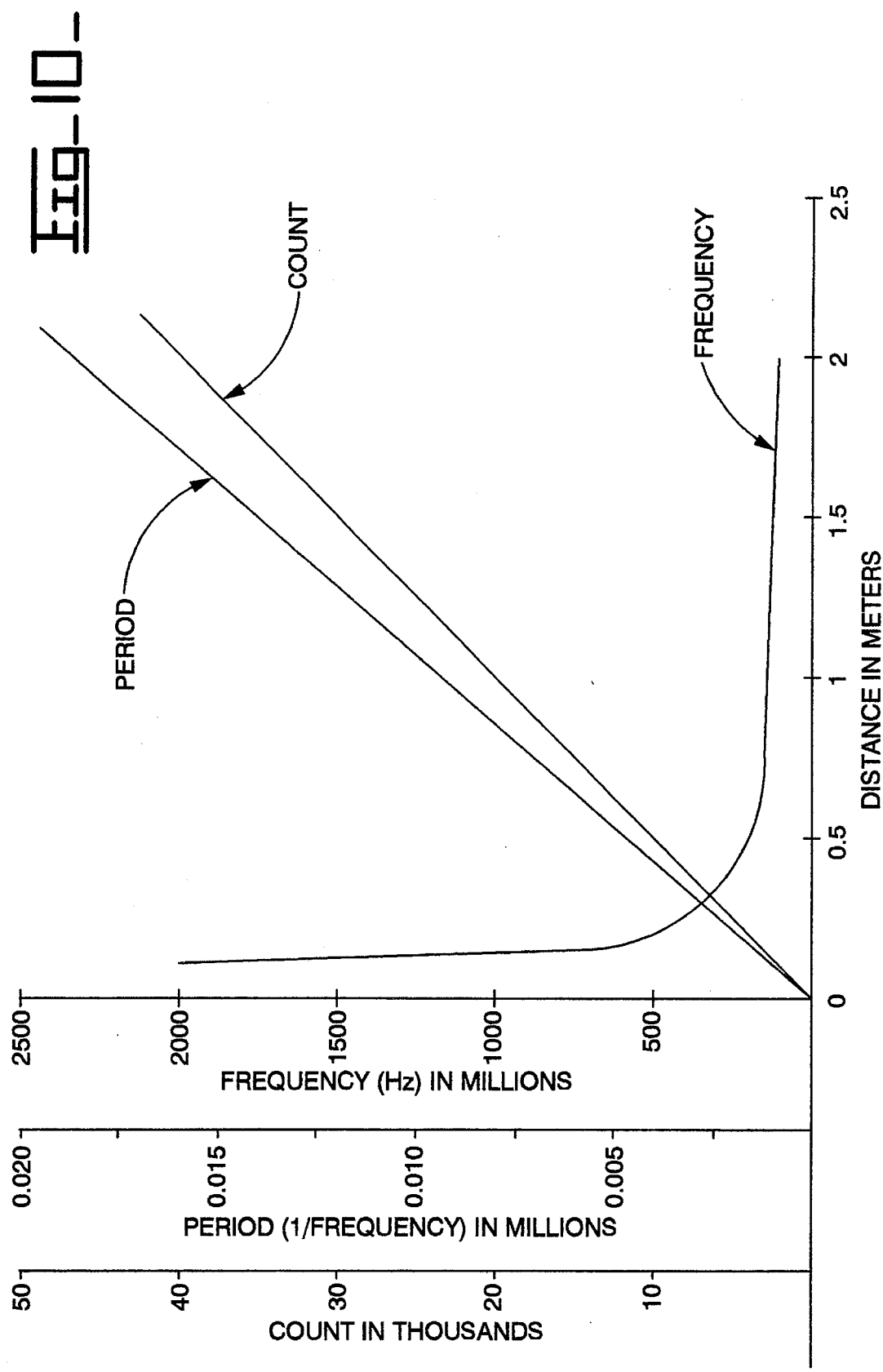
FIG. 10 is a graphical illustration of frequency, period and count variation, correlated with piston travel.

In accordance with the invention, the input coupler and the receiving coupler for the electromagnetic wave energy, which is usually in the microwave or radio frequency (RF) ranges, are positioned at 90 degree separation on the circumferential periphery of the cylinder.

The 90 degree separation operates to suppress coupling into standing wave modes that interfere with the ability to detect resonance frequency signals that are correlatable with the length of the cavity and hence the piston position. The coupling into modes other than the desired mode is sometimes referred to in the art as "cross talk" and makes proper signal detection more difficult.

The 90 degree coupler separation of the invention operates toward cancelling signals producing the "cross talk" whereas the conventional 180 degree coupler separation used heretofore in the art tends to reinforce the "cross talk".

Referring to FIG. 1 there is shown a perspective illustration of the relative positioning of the transmitting and receiving couplers in accordance with the invention. In FIG. 1, on a section of a hydraulic cylinder 1, an input coupler 2 and an output coupler 3, are positioned at locations with approximately 90 degree separation on the circumferential periphery of the cylinder 1. The input 2 and output 3 couplers are generally located near the end of the cylinder beyond the travel of a piston, not shown.

Referring to FIG. 2, a schematic angular illustration of the relative positioning of the input and output couplers is shown using the same reference numerals as in FIG. 1. In FIG. 2, the approximately 90 degree adjacent separation on the cylinder circumference of the couplers 2 and 3, in relation to the opposite 270 degree separation around the circumference of the cylinder, operates to suppress coupling into interfering modes.

Where the couplers are 180 degrees apart as heretofore in the art, the paths between couplers around the cylinder are equal and an additive effect takes place for the interfering mode. In contrast, at the 90 degree separation of the invention, the 90 degree vs the 270 degree paths produce a subtracting effect for the interfering mode.

In accordance with the principle of the invention the theoretical 90 degree positioning is preferable. It will however be apparent that minor degree variations that still essentially maintain the direct adjacent separation and odd multiple of that direct adjacent separation in the opposite path around the circumference of the cylinder, as shown in FIG. 2, would be satisfactory.

Referring next to FIG. 3, the preferred embodiment of the invention is illustrated wherein the coaxial cavity is employed that is associated with the rod side of the piston in the cylinder. In FIG. 3, in the cylinder 10, the piston 11 is attached to the rod 12, that, in turn, transfers movement, in the directions of the double headed arrow, to a load, not shown. A head member 13 at the end of the cylinder 10, closes the end of the cylinder 10 and surrounds the rod 12. The face 14 of the piston 11, to which the rod 12 is attached, and the internal face 15 at the head 13, serve as the shorting ends of a coaxial transmission line cavity 16 in which the rod 12 serves as the core member and wherein a transverse electromagnetic wave (TEM) mode is propagated. The insulated input coupler 17 and insulated output coupler 18, out of view in this Figure are, in accordance with the invention, positioned with 90 degree separation around the circumference of the cylinder 10, are located in or close to the head 13, beyond the travel of the piston 11, and, are exposed to the hydraulic fluid in the cavity 16 in the cylinder 10. The input coupler 17 and the output coupler 18, out of view, are loop magnetic couplers.

In order to provide four-fold symmetry around the core 12 and improved resonance shape "dummy" couplers 19 and 20, of which only element 19 is in view in this figure, are positioned with further 90 degree separation around the circumference of the cylinder 10. The fluid in the cylinder 10 is maintained through a valved port 21.

Referring next to FIG. 4, a view of the coupler portion of the head 13 along the line 4—4 of FIG. 3, the positioning of the input coupler 17, the output coupler 18 and the "dummy" couplers 19 and 20 are shown. The input 17 and output 18 couplers extend through the periphery of the head 13. The "dummy" couplers 19 and 20, do not connect to wires and may have different lengths. The individual lengths may be used to selectively tailor the resonance shape. The selective tailoring is depicted in FIG. 3, as an example, by reduction of length at a location labelled 20 which can operate to shape the antiresonance and thereby suppress signals from unwanted modes. The portion of the head 13 involving face 15 also provides a limit for piston travel. Sealing features, not shown, are usually provided on the piston 11 and on the head 13 to improve contact with the cylinder 10 and with the rod 12 to enhance shorting of the ends of the cavity 16.

In the cylinder 3 the piston 1 travels as indicated by the arrow in the cavity 16. A frequency signal, that varies over the range of frequencies at which fundamental resonances occur in the cavity 16 is transmitted by the transmitter section 31 into the hydraulic fluid in the cavity 16 via the coupler 17. Frequency signals received at coupler 18 are processed in the receiver section 33, where the presence of a resonance signal is identified by a comparison with a threshold level. A controller section 35 communicates with the receiver section 33 and the transmitter section 31 through channels 36 and 37 respectively. The gain of the receiver section 33, in turn, is equalized with piston travel to provide a reference processing level. In the controller section 35 information identified with each resonance signal is converted to count information using a divided sample of the transmitted frequency from the transmitter section 31. The divided sample is used to gate a precision oscillator signal in a counter the counts of which are proportional to the piston distance travelled. Correlation of the count information with piston distance travelled is tabulated in a static cylinder characterization operation before use.

The signals delivered through input coupler 17 and received through output coupler 18 are processed in a processing section 30 illustrated within a dashed line in FIG. 4. The processing section 30 is made up of a transmitter section 31 which delivers a signal that varies between a predetermined minimum and maximum frequency, for example from 50 megahertz (MHz) to 1.6 gigahertz (GHz) to the coupler 17 via conductor 32; and a receiver section 33 which detects the electromagnetic wave signals at the resonant frequencies that correlate with the length of the cavity 16 via the coupler 18 and conductor 34, and a controller section 35 in which the determination of the piston position and the related parameters of velocity and acceleration take place.

The signal improvement advantages of the positioning of the input coupler 17 and the output coupler 18, at the 90 degree separation of the invention, is graphically depicted in FIG. 5 in a comparison with couplers at 180 degree separation as practiced heretofore in the art. Referring to FIG. 5, peaks in gain coincide with mode resonances. The resonances are labelled in accordance with the mode number convention TEMNO employed in the art, where.

"m" is the circumferential mode number

"n" is the radial mode number, and,

"o" is the axial mode number

At 180 degree separation considerable care is required in distinguishing the peaks. The 90 degree separation of the invention suppresses coupling into an unwanted adjacent TE101 mode, making the desired $TEM_1$ mode more easily identified. More remote unwanted resonances such as the TE201 mode while less affected than the adjacent unwanted mode are still far enough away for clear definition of the desired modes. As may be seen in FIG. 5 the benefits of the invention are greatest under short cavity conditions where the 90 degree separation makes the signal variation between wanted and unwanted modes more pronounced and thus detectable, which in turn relaxes component and processing specifications. Under conditions where the rod 22 is considerably extended and the cavity 16 is so nearly collapsed that the aspect ratio of the cavity, that is the ratio of cylinder diameter to cavity length is nearly equal, the invention is of particular benefit in that, even under those conditions, the first resonance TEM1 is clearly distinguishable from the nearest resonances. With the prior art 180 degree separation, the TE101 resonance merges with the TEM1 resonance so that the TEM1 resonance is not clearly distinguishable. The next higher resonance (TEM2 or TE201) is far enough away from the TEM1 resonance that there is not a problem.

The improved signals of the invention are processed in a standard processing manner employed in the art as taught in U.S. Pat. Nos. 4,737,705 and 5,182,979, as examples. In the art, in general, the processing approach is as follows. In a transmitter section, a frequency signal is introduced into the cavity that is bounded by the piston, the cylinder and the end on the cylinder. The introduced frequency varies over a range that would include all the TEM1 resonance frequencies of all cavity lengths that would correspond to the piston travel. In a receiver section the resonances are detected over each increment of piston travel and through comparator circuitry individual resonances are identified. Computations then correlate TEM1 resonances with cavity length and hence piston position. Individual processing techniques involve features for resonance identification and signal processing in the presence of a noise environment in the cylinder.

The improved signal that this invention provides by the 90 degree spacing taught operates to reduce the need for noise control, simplifies resonance identification and relaxes criticality of component performance.

BEST MODE OF CARRYING OUT THE INVENTION

The piston position sensing system employs electromagnetic waves in the fluid of a hydraulic cylinder, in the form of a varying frequency signal transmitted into the hydraulic fluid in the cylinder. The varying signal covers the range of frequencies at which resonance of the cavity that is made up of the cylinder, the piston and the cylinder end, will take place over the range of piston travel. A frequency signal is sensed in the hydraulic fluid and is delivered to a signal receiver where information is extracted from the sensed frequency signal that permits identification of the position and motion parameters of the piston.

In the hydraulic cylinder cavity there is high loss of the transmitted signal except at a resonance frequency which is at a piston position or cavity length where energy is coupled into a particular mode standing wave thereby producing a significant signal.

There are variations in position sensing systems in the art among: having the cavity on the rod or on the head side of the piston; the excitation of particular mode standing waves; and the sensing of a TEM harmonic other than the fundamental TEM1. For purposes of simplicity and clarity of explanation a cavity on the rod side of the piston, excitement in the TEM mode and the sensing of the fundamental of the particular resonance frequency for the particular piston position or cavity length, will be discussed.

In FIGS. 6–14 there is described an electromagnetic wave piston position sensing system employing the invention.

While there are a number of ways in the art of detecting a fundamental resonance frequency, the technique of detecting the positive and negative slope intercepts of the resonance envelope with respect to a reference level, as described in U.S. Pat. No. 5,325,063 is very effective in identifying the frequency extremes of the resonance signal. The use of "frequency lock loop" circuitry to detect and track "lock on" points on the positive and negative portions of the resonance frequency signal envelope, together with selection of the location level of those "lock on" points with reference to the maximum amplitude dB and width of the envelope at that location level, permits calculations that yield highly accurate resonance frequency values with accommodation for device and service performance differences in the sensing system. Computation is employed in establishing an effective position for the resonance.

Referring to FIG. 5 it can be seen that a lock on the negative portion of the resonance signal is possible only when the TE101 resonance is suppressed by the 90 degree coupler separation of the invention in the case where the TE101 resonance is close to the TEM1 resonance.

Referring to FIG. 6 there is shown an illustration of the dimensional correlation of the hydraulic cylinder resonance frequency peaks with piston position. In FIG. 6, a piston such as 11 of FIG. 3 travels as indicated by the double directional arrow in the cylinder 10 between a limit 40 at the expanded end of the cavity 16 and a limit 41 in the vicinity of a closed or head end 42 where the cavity 16 is considered collapsed.

Further, in FIG. 6 in the dimensionally correlated graph of Resonance Frequency Peaks vs Amplitude, the curve 43 depicts the nonlinear increase in fundamental resonance amplitude and frequency with decrease in cavity length as the piston travels from the extended cavity limit 40 toward the collapsed cavity limit 41.

Referring to FIG. 7 there is illustrated a portion of a hydraulic cylinder transfer characteristic curve depicting the general shape of a resonance frequency signal 44, which in turn is an envelope of frequencies between the positive intercept 45 and the negative intercept 46, with a reference level, not shown, and with a peak region 47.

In electromagnetic wave hydraulic cylinder piston position sensing systems, the shape of the peak region and the fact that there are a number of variables related to lot to lot manufacturing differences and items related to use in service make accurate prediction of the insertion loss at resonance impossible. As examples, but not limited to, such variables would include size differences between cylinders, any seal leakage both electrical and hydraulic, differences between static and dynamic operation, differences in direction of operation, differences in temperature response, differences in oil such as pressure composition and contamination, and differences in performance over the lifetime of the apparatus. Each, and combinations thereof, may affect the ability to accurately determine a resonance frequency. Those variables may be referred to generically as device and service differences. The effect of many of those device and service differences and the shape of the peak region on the resonance signal 44 of FIGS. 7 and 8 results in excessive variation in the insertion loss at resonance.

The situation will be discussed in connection with FIG. 8 wherein there is provided an illustration of an electromagnetic wave resonance in which the envelope of frequencies in the resonance has positive and negative intercepts at a reference level that is removed from the peak. In FIG. 8 the resonance signal 44 is an envelope of frequencies that intercepts a reference level 48 at a positive 45 intercept P1, passes through an apex 47 that is a rounded peak region and then intercepts the reference level 48 at a negative intercept 46 labelled P2, often continuing to an antiresonance 49. The reference 48 is separated from the peak region 47 by several dB on the Gain scale.

In correlating the resonance signal 44 with a particular piston position, as the demands of accuracy become more rigorous, it becomes increasingly necessary to acquire a precise effective frequency and thus position value for the resonance signal. An accommodation for the factors that prevent accurate measurement, as described in U.S. Pat. No. 5,608,332 is achieved by selecting the reference 48 at a gain level separated from the peak region 47. For a variety of reasons the best performance is obtained when the threshold level 48 is set approximately 5 dB below the resonance peak region 47. Significant variation from the set threshold can cause loss of frequency lock or false frequency lock. Even minor variations from the threshold level can cause increased accuracy errors.

An accurate effective value for the period (Peff) of the resonance would be a function of P1 and P2 that can be expressed as F(P1, P2), the simplest example of which would be expressed as in equation 1.

$$F(P1,P2)=(P1+P2)/2 \qquad \text{Equation 1}$$

The difference between the intercepts P1 and P2 determines a resonance width parameter that can be expressed as P2/P1, any other equivalent expression of a resonance width parameter such as loaded "Q" could also be used.

The criteria involved in the selection of the "lock on" level and measurement parameters are illustrated in connection with FIGS. 9,10 and 11; wherein, in FIG. 9 an illustration is provided of the considerations involved in the selection of the level; in FIG. 10 a graphical illustration is provided of the advantages in taking the measurements in terms of the "period" and the "count" in correlating the information developed with piston travel; and in FIG. 11 an example correlating tabulation is shown of the cylinder data taken in a static characterization, of frequency, period, counts, period of counts and piston travel distance.

Having set the gain level for level 48 at the example of about 5 dB below the peak region 47, and at a high value of P2/P1 between the intercepts; the values of the resonance width parameter P2/P1, and P eff are tabulated, correlated with piston position, in a characterization operation and stored in a table indexed through values of P eff. The value P2/P1 at a given dB level below the peak region is uniquely related to the loaded "Q" of the cavity.

In FIG. 10, a graph is shown of the variation of "frequency" (Hz); "period", which is 1/frequency; and "count". "Count" may be defined as a counter output of a divided sample of the frequency with respect to piston travel distance. In FIG. 10 the frequency curve is non-linear, whereas, both the "period", and the "count" which is proportional to the "period", curves are linear and thus are directly correlatable with piston travel. The linearity provides advantages in taking measurement information in terms of "period" and "count".

In FIG. 9, four example resonance curves A–D at increasing values of gain or decreasing values of insertion loss, are illustrated with relation to a fixed measurement level positioned at the example 5 dB below peak. The reference line E is the fixed threshold selected level at 5 dB below the resonance peak. P2/P1 would be the P eff center period divided by the band width at the intercepts of the particular curve with reference level E.

In the case of curve A, no "lock on" would be detected because there are no intercepts with the reference level E. A large gain increase of around 5 dB would be indicated. In the case of curve B there are intercepts at points 50 and 51 but the value of P2/P1 with the bandwidth between those intercepts is less than the value of P2/P1 at 5 dB below peak. A moderate increase in gain of about 1 dB would be indicated. In the case of curve D there are intercepts at points 52 and 53 but the value of P2/P1 with the bandwidth between those intercepts would be greater than the value of P2/P1 at 5 dB below peak and a moderate decrease in gain would be indicated. In the case of curve C the value of P2/P1 for the bandwidth between the intercepts is equal to the value of P2/P1 for the 5 dB below peak level and would be selected as points P1 and P2 and are labelled 45 and 46 respectively. As the frequency from the transmitter section 31 of FIG. 4 increases and a "lock on" of a particular resonance occurs at P1, a temporary frequency increment is added, that moves the frequency to the vicinity of and slightly beyond P2, so that the frequency lock circuitry can search and lock onto the negative intercept, at P2.

Each cylinder piston position sensing system is individually characterized. This may be done by incrementally moving the piston throughout the cavity or stroke length (between 40 and 41 in FIG. 6) in position increments as small as the resolution of the sensing system will permit, while the "period" values at P1 and P2 respectively are measured, Peff and P2/P1 are calculated and all are stored for each position. The increments do not have to be equal. Usually the distance between increments is longer at lower frequencies.

In addition, the number of "counts" in each resonance at an example 16 MHz, and ,the period of the 16 MHz count, the transmitted frequency and the period of the transmitted frequency are all correlated with piston travel distance and stored in tabulated form. The stored information provides static measured information of the resonance frequency at each piston position throughout the stroke length. A look up table, an example of which is shown in FIG. 11, is assembled, with an appropriate index such as Peff, not shown, using the characterization information, and is employed in calculating and in correlating counts in counters with piston travel. The stored information values that are placed in the look up table may be in the form for use, or calculations may be performed on the measured values, as each is used.

In FIG. 12 a general cycle event time chart is provided. In the chart there are five time segments T1 to T5 in a cycle between reset signals. The cycle period includes "search" and "lock" periods for each of the rising and declining "lock on" points, and a calculation and transmission period in which the period, the Peff, and the P2/P1 values are established, followed by transmission of the values which are then used in the next cycle.

In FIG. 12, at T1 the search and lock for the positive intercept P1 takes place followed by a count and read period labelled T2. At T3 the search and lock for the negative intercept P2 takes place followed by a count and read period labelled T4. In the T5 period, the Peff, and P2/P1 values are calculated, and transmitted for a comparison operation with the look up table value from which the piston position is determined. The events of the chart of FIG. 12 are executed each cycle, which as an example may be 20 milliseconds. An actual determination only occurs when needed.

Referring to FIG. 13 there is shown a graphical illustration of the range of the equalization adjustment that compensates for the difference in amplitude of the resonance frequency peaks with piston travel. In FIG. 13 the curve 54 corresponds to the curve 43 of FIG. 6 and the curve 55 is an equalizer signal curve which is equal and opposite to curve 54 as described in U.S. Pat. No. 5,182,979. The combination of the two gain values at each point results in a gain reference level, labelled element 56 that has a 0 dB slope.

Figure 14:
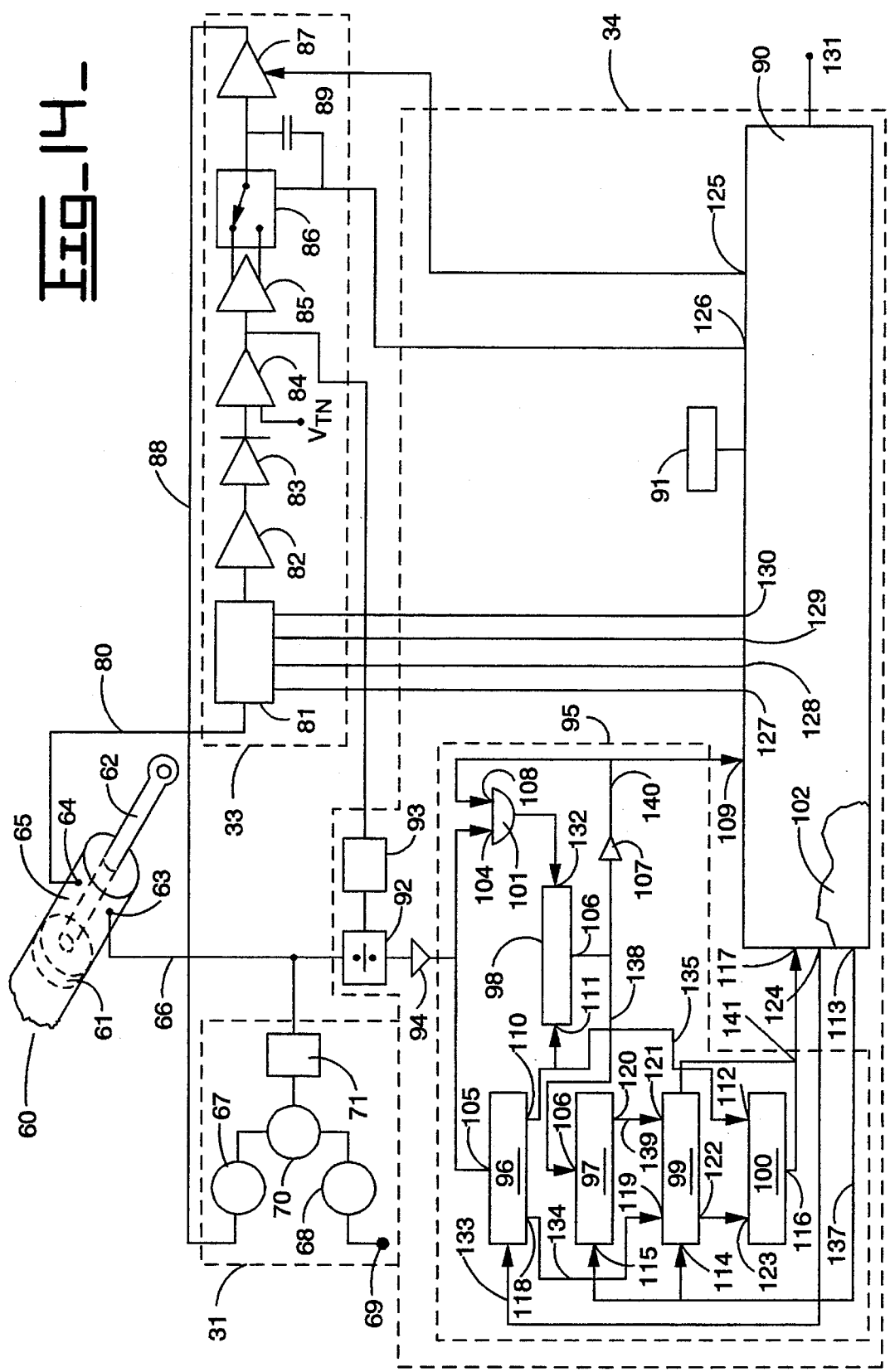
FIG. 14 is a functional block diagram of signal processing in electromagnetic wave piston position sensing.

In FIG. 14 there is shown a functional block diagram of the electromagnetic wave piston position sensing system of the invention.

Referring to FIG. 14, the cylinder coupling is that of the direct adjacent coupler separation with an odd multiple of that separation in the opposite path around the circumference of the cylinder, as described in connection with FIGS. 1–5. In the cylinder 60, the piston 61 is shown dotted on the rod 62. The transmit 63 and receive 64 couplers are mounted 90 degrees apart on the peripheral circumference of the cylinder 60 with two selected length dummy couplers (not shown) each at a further 90 degree separation on the peripheral circumference of the cylinder 60 from an adjacent transmit coupler 63 or receive coupler 64. The hydraulic fluid containing cavity 65 is coaxial with four fold symmetry wherein standing wave propagation is in the (TEM) mode and adjacent modes are suppressed. Strong, well defined, signals are produced at each resonance over the full travel of the piston 62 in the cylinder 60.

In general operation, in piston sensing signal processing, in a transmitter section, a frequency signal is introduced into the cavity 65 that varies in frequency over a range that would include all the resonance frequencies of all cavity lengths that would correspond to the full piston travel. In a receiver section, the frequency signals of the fundamental resonances received at each increment of piston travel, are compared with a threshold level and through comparator circuitry and computation the particular resonances are correlated with piston position and the related aspects velocity and acceleration.

In FIG. 14 the transmitter section 31 of FIG. 4, shown in dotted outline, involves elements 66–71 which deliver the input frequency signal through conductor 66 to input coupler 63. Two voltage controlled oscillators 67 and 68 are used in the presence of a voltage signal at terminal 69 to produce a beat signal that covers the range, for example from 50 MHz to 1800 MHz, of resonance frequencies to be encountered in the piston travel. At the low frequency, about 50 MHz, both oscillators 67 and 68 are at about 5000 MHz, whereas at the high frequency, about 1800 Mhz, one oscillator would be at about 5000 MHz and the other would be at about 3200 MHz. The outputs of the oscillators 67 and 68 are combined in a balanced mixer 70 the output of which is passed serially through a low pass filter 71.

The receiver section 33 of FIG. 4, shown in dotted outline, involves elements 82–89, delivers from coupler 64, on conductor 80 the resonance frequency signals processed at each cycle of the timing chart. In receiver section 33 the signals pass through an amplifier equalizer circuitry element 82 that performs the function of FIG. 13, a detector element 83, to a threshold comparator 84. The amplifier equalizer element 82 provides an impedance that is substantially equal to the inverse of that of the cylinder 60 so as to match the curve 54 of FIG. 13 with the curve 55 and thereby produce the net zero slope reference 56. The detector element 83 provides a signal indicative of the amplitude for use in a comparison with a constant threshold voltage in the threshold comparator element 84.

When a signal indicative of "lock on" or comparison in element 84 occurs the intercept P1 of FIG. 8 has been reached. The signal from element 84 enters an invert-non invert amplifier 85 and select switch 86 to an integrator 87 having an output that feeds back to the voltage controlled oscillator 67 through conductor 88. The invert non-invert amplifier 85 and select switch 86 inverts signal from element 84. Capacitor 89 is connected between line 126 and the input of the integrator 87. The voltage on line 126 controls the position of select switch 86 and creates a charge spike from capacitor 89. During voltage changes the charge spike from capacitor 89 temporarily increases the frequency of the oscillator 67 sufficiently to be near but beyond the declining portion of the resonance envelope so that the frequency locked loop circuitry locks on and establishes the intercept P2 of FIG. 8. The operation is reversible. The circuitry also moves the frequency locked loop from the intercept P2 to the intercept P1.

The controller section 35 of FIG. 4 involving elements 90–131 shown in dotted outline, includes a controller element 90, a "look up" store element 91 with an output into the controller 90, a prescaling element 92, having an enable function, and having an input connected to the output of element 71 of the transmitting section 13 and an enabling input connected to a lock detecting element 93, the input of which is connected to the output of the threshold comparator 84. The output of the prescaling element 92, through a back circuit inhibiting diode 94 is the input to a counting means 95, enclosed in a dotted line, that develops position information. The counting means is made up of: a first flip-flop 96 of the "D" type having a "SET" input, a "RESPONSE" input and "POSITIVE" and "INVERTED" outputs; a second "D" type flip-flop 97; a first counter 98; a second counter 99; a third counter 100; an "And" element 101 and a precision oscillator 102, that delivers square 16 MHz pulses that have sufficient definition to be sensed separately on leading and trailing portions, and which is located in the controller 90.

The output of the element 94 is connected to an input 103 of flip-flop 96 and to input 104 of "and" element 101. The output 105 of counter 98 is connected to an input 106 of flip-flop 97, serves, through a back circuit inhibiting diode 107 as the remaining input 108 of "and" element 101 and also serves as an input 109 to the controller 90. The inverted output 110 of the flip-flop 96 is connected to input 111 of counter 98 and to one input 112 of counter 100. The output 113 of the precision oscillator 102 is connected to input 114 of counter 99 and to input 115 of flip flop 97. The output 116 of counter 100 is connected to the input 117 of the controller 90. The positive output 118 of flip-flop 96 is connected to input 119 of counter 99, which carries the overflow of counter 99 to counter 100. The output 120 of flip-flop 97 is connected to input 121 of counter 99. The output 122 of counter 99 is connected to input 123 of counter 100.

The controller 90 provides reset signals at terminals 124 and 125 respectively to flip-flop 96 and integrator 87, and it also provides a select signal to the switch element 86 on conductor 126.

The controller 90 in addition to providing position related computations also performs the comparison operations using "look up" data from element 91 which contains all the stored values and with information from the counting means 95 to deliver position information at each processing cycle.

The controller 90 also has an external utilization output 131 for the delivery to an external utilizer of piston position, and related velocity and acceleration information.

In order to provide a starting place in practicing the invention the following counting example and specifications are provided. The components are standard elements.

For definition purposes, when a counter is "cleared" it cannot operate and all outputs are zeros; and when a flip flop is "cleared" it is operable and the "set" terminal is high, the positive output is zero and the invert output is 1.

In operation the counter is synchronized under the following conditions.

The controller 90 holds the "Reset" terminal of the flip-flop 96 low which retains the flip flop in a cleared condition. In this condition the positive output 118 is low which holds input 119 so that counter 99 is in a cleared condition whereas the inverted output 110 of flip-flop 96 is high which holds counters 98 and 100 in the reset condition. The output 105 of counter 98 being low holds flip-flop 97 through terminal 106 in a cleared condition which in turn causes the inverted output 120 thereof to be high and enable counter 99 at terminal 121 even though counter 99 is being held in a cleared condition by the condition of flip-flop 96. The high condition of terminal 108 enables the "and" element 101. The transmit section frequency, divided by 256 is impressed at terminals 103 and 104, and because the "and" gate 101 is enabled it is also impressed on the counter 98 at terminal 132. The counting is enabled by the controller changing the reset signal at terminal 124 from low to high which in turn is impressed via line 133 on the "Reset" terminal of the flip flop 96. Lines 134 and 135 do not change.

The synchronized count of counters 98 and the 99–100 combination begins with line 136 going from low to high when the lock detect element 93 enables the element 92 that provides a divided source of the transmitted frequency. Line 134 changes from low to high, enabling counter 99 which counts the rising edges of the 16 MHz pulses impressed via line 137. No time conflict exists because lines 134 and 137 are asynchronous. Line 135 changes from high to low, which enables counters 98 and 100. Counter 98 counts the trailing edges of the pulses passing through "and" 101 and impressed at input 132. No time conflict exists on the counter 98 start up because counter 98 is enabled on the leading edge of line 136 whereas the count is based on the trailing edge of the pulses.

The synchronized count of counters 98 and the 99–100 combination stops when the counter 98 counts to the effective equivalent of a scaled period of a resonance. For an example where the period is 130944 cycles, a division in element 92 of 256 would yield 511.5. At the example count of 511.5, the 0.5 being the trailing edge of the last count, line 138 changes from low to high removes flip flop 98 from the cleared condition so that the next low to high transition on line 137 (the next leading edge of a 16 MHz pulse) causes line 139 to go low which stops the count in the 99–100 counter combination. No time conflict exists in the count stopping because the transport delay of flip flop 97 guarantees that the 99–100 counter combination will have had time to complete all in process transitions before the counting process is disabled by line 139 going low. Line 140 changes from high to low which is a signal to controller 90 that the count is complete. Line 140 also disables "and" 101 which stops counter 98. No time conflict exists because all "in process" transitions in the counters are complete before the count is stopped. The controller reads the counters via line 141 at times T2 and T4 of the timing cycle. The counting cycle repeats when the controller 90 again changes the reset line 133 from low to high.

Example Specifications are as follows.

A satisfactory operating voltage is about +24 V. D.C.

The signal transmitted on conductor 66 to coupler 63 varies from about 50 MHz to about 1.6 GHz.

A satisfactory prescaler element 92 is a model MB506 manufactured by Fujitsu and set to divide by 256.

The lock detector element 93 is a standard window comparator in the art made up of parallel connected comparators.

The "look up" table store, element 91, is a standard programmable read only memory element, some models of which are referred to in the art as PROMS. A satisfactory PROM model is the TMS27PC512 model manufactured by Texas Instruments (TI).

The controller element is a standard microprocessor in the art. A satisfactory microprocessor is the MC68HC11 model manufactured by Motorola, of Roselle, Ill.

The counter elements 98 and 100 are standard integrated circuits. A satisfactory integrated circuit model is the 74HC 4040 manufactured by TI.

The counter element 99 is also another standard integrated circuit. A satisfactory model is the 74HC161 manufactured by Motorola.

The "D" type flip flop may be the model 74 HC74 manufactured by Motorola.

The element 89 is a 200 picofarad capacitor.

It will be apparent that while the elements of the counting means 95 are illustrated for clarity as a discrete assembly the elements and functions could readily be incorporated into the controller by providing the capacity therein.

It will be apparent from the processing example that piston location sensing systems using electro magnetic waves in hydraulic cylinders will be heavily dependent on good signals and that the benefits of this invention will significantly improve such systems.

What has been described is the improvement of signals in electromagnetic wave detection of the position, velocity and acceleration of a piston in a hydraulic cylinder by positioning the input and the output probes into the cylinder at locations separated by 90 degrees on the circumference of the cylinder so as to suppress coupling into unwanted modes that diminish detectability of the signal.

Other aspects, objects and advantages of the invention can be obtained from a study of the drawings, the specification and the appended claims.

What is claimed is:

1. In a hydraulic cylinder, piston and rod combination with a piston location sensing system of the type wherein signals indicative of the resonance frequency of electromagnetic waves are introduced into and sensed in the fluid of the cylinder through input and output probes extending to the outside of the cylinder, the improvement comprising:

said input and output probes into said cylinder being positioned with approximately 90 degree separation on the circumferential periphery of said cylinder.

2. The improvement of claim 1 wherein said probes are positioned adjacent an end of said cylinder.

3. The improvement of claim 1 wherein said probes are positioned on the portion of said cylinder surrounding said rod.

4. The improvement of claim 3 wherein said probes are positioned adjacent an end of said cylinder.

5. A piston position sensing hydraulic cylinder, piston and rod combination structure comprising:

a hydraulic cylinder, said hydraulic cylinder having a first closed end member on a first end thereof and a second, rod accommodating, closed end member on an opposite end thereof, said hydraulic cylinder further having a piston adapted for fluid pressure directed travel between said closed ends, said piston having a rod attached thereto, said rod extending through said rod accommodating closed end and extending beyond said cylinder, an electrical signal input probe, and, an electrical signal output probe, said input and said output probes each extending into said cylinder and into contact with hydraulic fluid within said cylinder, and, said input probe and said output probe being positioned with approximately a 90 degree separation from each other on the circumferential periphery of said cylinder.

6. The structure of claim 5 wherein said input and said output probes are positioned on said cylinder adjacent said first closed end member.

7. The structure of claim 5 wherein said input and said output probes are positioned on said cylinder adjacent said second, rod accommodating, closed end member.

8. The structure of claim 5 including first and second dummy probes said first dummy probe being positioned 90 degrees around the circumferential periphery of said cylinder from said input probe in the direction away from said output probe and said second dummy probe being positioned 90 degrees around the circumferential periphery of said hydraulic cylinder from said output probe in the direction away from said input probe.

9. The structure of claim 5 wherein said input and said output probes are loop magnetic couplers.

10. The structure of claim 9 including first and second dummy probes, said first dummy probe being positioned 90 degrees around the circumferential periphery of said cylinder from said input probe in the direction away from said output probe and said second dummy probe being positioned 90 degrees around the circumferential periphery of said hydraulic cylinder from said output probe in the direction away from said input probe.

11. The structure of claim 10 wherein at least one said dummy probe has a length related to a selected resonance signal characteristic.

12. In apparatus for sensing signals indicative of the resonance frequency of electromagnetic waves in the fluid of a hydraulic cylinder that are correlatable with the position of a piston in the cylinder, a means for providing improved signal definition of said resonance frequency electromagnetic wave signals comprising:

an input probe extending into said cylinder for introducing electromagnetic signals into said hydraulic fluid, said input probe being located at a first position on the circumferential periphery of said cylinder, and, an output probe extending into said cylinder for sensing electromagnetic waves in said hydraulic fluid, said output probe being located at a second position on the circumferential periphery of said cylinder, said first and second positions being separated on said circumferential periphery by a first separation distance on said circumferential periphery in a first direction around said circumferential periphery and by second, substantially greater, separation distance, said second distance being an odd multiple of said first separation distance in the direction around said circumferential periphery that is opposite to said first direction.

13. The improved signal definition means of claim 12 wherein said input and said output probes are positioned on said cylinder adjacent a closed end member on said cylinder.

14. The improved signal definition means of claim 12 wherein said input and said output probes are positioned on said cylinder adjacent a rod accommodating, closed end member, on said cylinder.

15. The improved signal definition means of claim 13 wherein said separation distance is defined by a 90 degree arc on said circumferential periphery.

16. The improved signal definition means of claim 14 wherein said separation distance is defined by a 90 degree arc on said circumferential periphery.

17. The improved signal definition means of claim 16 including first and second dummy probes said first dummy probe being positioned 90 degrees around the circumferential periphery of said cylinder from said input probe in the direction away from said output probe and said second dummy probe being positioned 90 degrees around the circumferential periphery of said hydraulic cylinder from said output probe in the direction away from said input probe.

18. The improved signal definition means of claim 17 wherein said input and said output probes are loop magnetic couplers.

19. The improved signal definition means of claim 18 wherein at least one said dummy probe has a length related to a selected resonance signal characteristic.

20. The apparatus of claim 12, wherein said first and second positions occupied by said input and output probes produce destructive interference between radiation signals propagating in opposite directions around the circumference of said cylinder.

* * * * *